United States Patent [19]

Schirmer

[11] Patent Number: 5,035,851
[45] Date of Patent: Jul. 30, 1991

[54] METHOD OF MAKING VERY HIGH BARRIER FILM

[75] Inventor: Henry G. Schirmer, Spartanburg, S.C.

[73] Assignee: W. R. Grace & Co.-Conn., Duncan, S.C.

[21] Appl. No.: 644,467

[22] Filed: Jan. 18, 1991

Related U.S. Application Data

[63] Continuation of Ser. No. 934,581, Nov. 25, 1986, abandoned.

[51] Int. Cl.$^5$ .................... B29C 47/06; B29C 55/12; B29C 55/28; B32B 31/30
[52] U.S. Cl. .................... 264/514; 156/244.13; 156/244.14; 156/244.24; 264/171; 264/173; 264/178 R; 264/209.3; 264/210.1; 264/211.18; 264/211.2; 264/289.3; 264/290.2; 264/562; 264/564
[58] Field of Search ............ 264/171, 173, 178 R, 264/209.3, 210.1, 210.6, 211, 211.13, 211.18, 211.2, 235.8, 237, 289.3, 290.2, 514, 557, 562, 564; 156/244.11, 244.13, 244.14, 244.24

[56] References Cited

U.S. PATENT DOCUMENTS

| | | | |
|---|---|---|---|
| 3,707,590 | 12/1972 | Wiggins et al. | 264/514 |
| 3,741,253 | 6/1973 | Brax et al. | 138/137 |
| 4,048,428 | 9/1977 | Baird, Jr. et al. | 264/173 X |
| 4,166,082 | 8/1979 | Hisazumi et al. | 264/557 X |
| 4,169,910 | 10/1979 | Graboski | 264/171 X |
| 4,265,949 | 5/1981 | Kugimiya | 383/106 |
| 4,352,850 | 10/1982 | Yamamoto et al. | 428/214 |
| 4,557,780 | 12/1985 | Newsome et al. | 156/244.11 |
| 4,561,920 | 12/1985 | Foster | 156/244.11 |
| 4,572,854 | 2/1986 | Dallmann et al. | 156/244.11 X |
| 4,576,988 | 3/1986 | Tanaka et al. | 524/503 |
| 4,590,131 | 5/1986 | Yazaki et al. | 428/516 |
| 4,640,852 | 2/1987 | Ossian | 428/35.4 |
| 4,701,360 | 10/1987 | Gibbons et al. | 428/34.2 |

FOREIGN PATENT DOCUMENTS

| | | | |
|---|---|---|---|
| 49279 | 11/1985 | Australia . | |
| 71330 | 2/1983 | European Pat. Off. . | |
| 3229158 | 2/1983 | Fed. Rep. of Germany . | |
| 59-182714 | 10/1984 | Japan | 156/244.11 |
| 2014476 | 8/1979 | United Kingdom . | |
| 2106471 | 4/1983 | United Kingdom . | |
| 2121062 | 12/1983 | United Kingdom . | |

OTHER PUBLICATIONS

Iwanami, T. et al., "Ethylene Vinyl Alcohol Resins for Cas-Barrier Material". *Tappi Journal*, vol. 66, No. 10, (Oct. 1983), pp. 85-90.
*Modern Plastics*, Nov. 1986, pp. 18, 21, 22 and 93.

*Primary Examiner*—Leo B. Tentoni
*Attorney, Agent, or Firm*—John J. Toney; William D. Lee, Jr.; Mark B. Quatt

[57] ABSTRACT

A method of producing an oxygen barrier film, and the resulting film, includes the coextrusion of a multi-layer extrudate having an outside ethylene vinyl alcohol copolymer layer which has been passed through a hot water system to soften and wet the ethylene vinyl alcohol copolymer. The wetted film can be more easily oriented to produce a shrinkable film.

4 Claims, 1 Drawing Sheet

METHOD OF MAKING VERY HIGH BARRIER FILM

This application is a continuation of application Ser. No. 934,581 filed on Nov. 25, 1986, now abandoned.

BACKGROUND OF THE INVENTION

This invention relates to thermoplastic shrink films, and particularly thermoplastic shrink films which provide a very high oxygen barrier. More particularly, this invention relates to a thermoplastic coextruded oriented shrink film which provides very high oxygen barrier properties.

Ethylene vinyl alcohol copolymer (EVOH) is well known as an oxygen barrier resin suitable for use in multi-layer films. It is also recognized that vinylidene chloride copolymers, commonly known as SARAN also exhibit oxygen barrier characteristics in a multi-layer film. However, the characteristics of these barrier materials are such that their effectiveness as oxygen barriers is effected by the humidity of the environment in which the film is used, i.e. the barrier properties of these barrier materials are humidity sensitive. The dependence of EVOH on humidity in estimating its gas barrier properties is discussed in the article *Ethylene Vinyl Alcohol Resins for Gas-Barrier Material* by T. Iwanami and Y. Hirai. This article discusses the degradation in oxygen barrier properties of the EVOH as humidity increases.

Vinylidene chloride copolymers (SARAN) typically exhibit the opposite behavior, with oxygen barrier properties improving somewhat with an increase in humidity conditions.

The combination of EVOH and saran in a coextruded multi-layer film is therefore desirable. This would reduce the overall effect of changes in humidity on the oxygen barrier characteristics of the film.

An additional problem in the use of EVOH, with or without a separate saran layer in a multi-layer structure, is the cracking problem associated with EVOH. In the past, this cracking problem has been somewhat alleviated by blending EVOH with nylon. The nylon also contributes to ease in orientation of a film containing an EVOH resin. Such processing advantages are made, however, at the expense of higher oxygen transmission rates of EVOH/nylon blends compared with EVOH alone.

Still another problem with unblended EVOH is the difficulty in orienting coextruded EVOH out of a hot water system where EVOH is an inner layer. The EVOH has significantly higher orientation temperature ranges than saran, and when both materials are utilized within a single multi-layer film, an incompatibility in orientation temperature ranges results. While a saran material orients relatively easy after being passed through a hot water system, the EVOH inner layer does not respond as well, and difficulty in orientation results. This is particularly true in the blown bubble technique for orientation well known in the art for producing biaxially oriented film useful in many shrink film applications.

An additional problem with "trapped" EVOH, i.e. EVOH forming an interior layer of a multi-layer structure is the difficulty in removing water from the layer once wetting has occurred. Of course, this difficulty in drying trapped EVOH results in a corresponding loss in oxygen barrier properties because of the poorer barrier performance of EVOH at higher relative humidities.

A past solution to the problem of orienting EVOH out of hot water has been the use of relatively high mole percents of ethylene in the EVOH copolymer. Typically, EVOH resins having between 32 and 38 mole percent ethylene have been employed, and especially those at the higher end of this range, to permit EVOH to approach more closely the orientation characteristics of ethylene vinyl acetate copolymer, and therefore orient more easily.

While the higher ethylene content EVOH resins solve to some extent the problem of orienting an EVOH containing film out of hot water, they also suffer from the disadvantage of reduced barrier properties. As a general rule, the higher the ethylene content in the EVOH, the lower the oxygen barrier properties of the resin, in films employing the resin.

It has now been found that EVOH may be coextruded as an outside layer in a multi-layer film having for example at least one additional polyolefin layer and/or a saran layer, and the coextruded film can be passed through a hot water system and thereafter oriented. The EVOH is wetted and softened by the hot water during the passage of the coextruded film through the hot water. This wetting and softening effect significantly reduces the orientation temperature range of the EVOH to render it much more compatible with the saran layer of the structure if one is present, and in any case to lower the orientation temperature range of the EVOH significantly. Blending of minor amounts of nylon for processing purposes is unnecessary.

Such a reduction in the orientation temperature range of EVOH results in efficiencies in processing compared to a hot oil or hot air orienting system.

Although the EVOH is obviously wetted during the orientation process, its position as an outside layer of the multi-layer film permits relatively rapid drying of the same layer to substantially restore its oxygen barrier characteristics.

An additional advantage is that by employing this method, EVOH resins with a lower mole percent of ethylene can be used, and therefore a higher barrier EVOH resin can be employed.

For extrusion purposes, it is preferable to use a relatively high melt index EVOH resin as an outside layer. Melt indexes of at least 15 grams per 10 minutes (ASTM D-1238) and more preferably at least 20 grams per 10 minutes are preferred. With a melt index of less than about 15 grams per 10 minutes, extrusion becomes increasingly difficult. At melt indexes below about 10 grams per 10 minutes, coextrusion of a multi-layer film with the EVOH as an outside layer becomes very difficult or impossible.

It is an object of the present invention to provide a method of using lower ethylene content EVOH resins in multi-layer shrink films in order to obtain the better oxygen characteristics of these lower ethylene content resins.

Its a further object of the present invention to provide a method for orienting EVOH-containing multi-layer films at relatively low temperatures.

It is yet another object of the present invention to provide an EVOH-containing multi-layer oriented shrink film wherein the EVOH can dry relatively easily compared to trapped EVOH-containing structure.

SUMMARY OF THE INVENTION

In one aspect of the present invention, a method of producing an oxygen barrier shrink film comprises coextruding a multi-layer film comprising an outside ethylene vinyl alcohol copolymer layer, and at least one layer bonded to the outside layer and comprising a polymeric material selected from the group consisting of a polyolefin or chemically modified polyolefin and a vinylidene chloride copolymer; and softening and wetting the ethylene vinyl alcohol copolymer layer by passing the coextruded film through hot water.

In another aspect of the present invention, a multi-layer oriented film is produced by the steps of coextruding a multi-layer extrudate comprising an ethylene vinyl alcohol copolymer as an outside layer, and at least one layer bonded to the outside layer and comprising a polymeric material selected from the group consisting of a polyolefin or chemically modified polyolefin and a vinylidene chloride copolymer; and softening and wetting the ethylene vinyl alcohol copolymer layer by passing the coextruded film through hot water.

Of interest is U.S. Pat. No. 4,576,988 issued to Tanaka et al and disclosing a melt molding material having a silicon-containing ethylene vinyl alcohol copolymer coated with vinylidene chloride.

Also of interest is UK Patent Application GB 2014476 A issued to Kuga et al and disclosing a substrate of polyvinyl alcohol coated on one or both sides with an aqueous dispersion of vinylidene chloride vinyl chloride copolymer.

Also of interest is UK Patent Application GB 2121062 A issued to Mollison disclosing a pouch made from a film comprising a laminate of a base film and a sealant fim. The base film may be a saponified ethylene vinyl acetate film. A layer of PVDC may be interposed between the base film and sealant film.

Also of interest is UK Patent Application No. GB 2106471 A issued to Maruhashi et al disclosing a vessel comprising one or more layers of ethylene vinyl alcohol copolymer coated with a vinylidene chloride copolymer layer.

DESCRIPTION OF THE DRAWINGS

In the sole drawing attached to this application and made a part of this disclosure.

DESCRIPTION OF THE PREFERRED EMBODIMENTS

Figure 1:
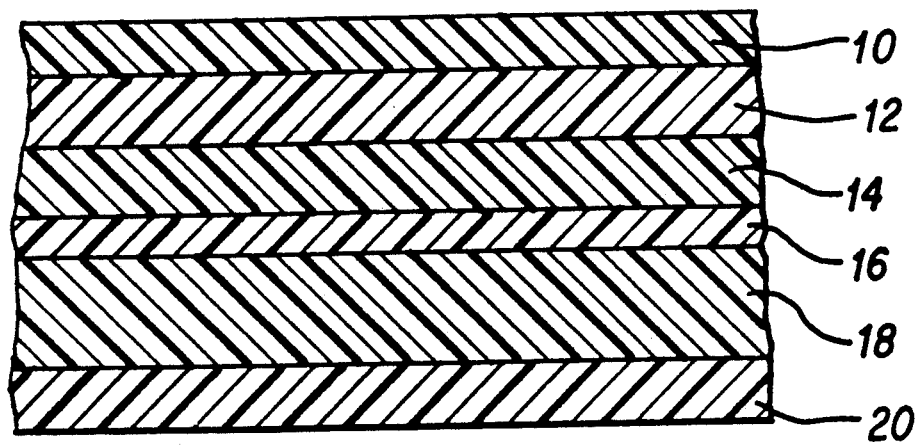
FIG. 1. is a schematic cross-sectional view of a multi-layer film in accordance with the present invention.

Referring to FIG. 1, a schematic cross section of a multi-layer film is shown. Outside layer 10 comprises an ethylene vinyl alcohol copolymer having a melt index of at least about 10 grams per cubic centimeter, more preferably a melt index of at least about 15 grams per cubic centimeter, and most preferably a melt index of at least about 20 grams per cubic centimeter. Optionally, a nylon or nylon copolymer may be blended with the EVOH. Because of the advantages obtained by the present invention, EVOH resins with relatively low percentages of ethylene, and therefore higher oxygen barrier characteristics can be used in outside layer 10. Preferred ethylene contents range from 22 to 29 mole percent. EVOH resins having between 32 and 38 mole percent can also be used, but of course will provide relatively inferior barrier properties.

Layer 12 comprises a polyolefin or modified polyolefin. In the event that optional layers 14, 16, 18, and/or 20 are incorporated into the multi-layer film structure, layer 12 is preferably an anhydride-modified or otherwise chemically modified polyolefin which promotes adhesion between layer 14 and outside layer 10. These adhesives are commercially available from several suppliers including the Plexar series of adhesive resins from Norchem, the CXA series from DuPont, and Admer modified resins available from Mitsui Company. Layer 14 is preferably a barrier material, more preferably a saran. Both plasticized and unplasticized sarans are available.

Layer 16 preferably comprises polyolefin or a copolymer of ethylene with a comonomer such as vinyl acetate. Most preferably, layer 16 comprises a relatively high vinyl acetate EVA.

Layer 18 comprises a polyolefin or blend of polyolefins, and more preferably comprises a blend of polybutylene and polypropylene.

The outer layer 20 may comprise a polyolefin such as polypropylene.

As depicted in the drawing, only a relatively thin layer of the outside layer 10 is necessary to obtain the advantages of the invention.

The invention may be better understood with reference to the following examples given by way of illustration only.

EXAMPLE 1

A six layered structure was extruded by supplying six extruders. The first extruder which supplied the die orifice for the outside layer was provided with a blend of 90% EVOH (Soarnol ZL from Nippon Goshei) and 10% copolyamide (Grillon CA6). The EVOH had a melt index of 20 grams per 10 minutes.

The second extruder supplied the die orifice for the layer adjacent the outside layer with a modified ethylene vinyl acetate copolymer (CXA-E162 from DuPont).

The third extruder supplied a die orifice for the next layer and was provided with unplasticized SARAN (PV864 from Solvay). The SARAN was pre-blended with minor amounts of processing aids.

The fourth extruder supplied a die orifice for the next layer and was provided with ethylene vinyl acetate copolymer (Alathon 3170 from DuPont).

The fifth extruder supplied a die orifice for the next layer, and was provided with a blend of 50% ethylene propylene copolymer having about 3.8% ethylene by weight (Eltex KS 409x6206 from Soltex) and 50% polybutylene (PB 8640 from Shell).

The sixth extruder supplied the die orifice for the inside layer and was provided with ethylene propylene copolymer (Dypro from Cosden Chemical Company).

The various layers were coextruded through a die orifice as a tubular extrudate.

The tape was then quenched in a cold water bath, and passed to a hot water system. The entire film, including the outside blend layer containing the EVOH, was passed through the hot water. This step allowed the EVOH layer to be thoroughly wetted, and softened.

The coextruded film was then biaxially oriented using a blown bubble technique well known in the art.

EXAMPLE 2

A multi-layer oriented film substantially similar to that of example one, but having an outside layer of 100% EVOH (Soarnol ZL) was made under the same conditions as those described in example 1.

EXAMPLE 3

A multi-layer film similar to that of example 2 was made, with a relatively low melt index EVOH (EVAL EC-F101 available from Eval Company of America). The resulting film had a poor outer surface (EVOH) because of the viscosity mismatch between the relatively viscous EVOH and the remainder of the film material.

The term "hot water" as used in the above examples refers primarily to water at or near its boiling point, i.e. in the vicinity of 180° to 212° F. However, this term is also used herein to describe embodiments in which water at lower temperatures is subsequently heated by some additional processing step. For example, in orienting a coextruded film, it is preferred that the water be at or near 212° F. However, water at lower temperatures could be used. After the tape is passed through the water bath, it may then be heated by passing the tape through a hot air oven or other heating means which will bring the tape up to its orientation temperature. In another embodiment, a thermoformable film constructed as described may be passed through a water bath at substantially room temperature, and then heated by suitable heating means at the beginning of a thermoforming operation.

It has been discovered that utilizing gan outside surface layer of EVOH provides oxygen barrier properties in the film, at relatively high humidities, which actually improve somewhat after the first two or three weeks. This is demonstrated by Table 1, showing dry and wet $O_2$ transmission readings for the films of Examples 1 and 2. The 100% RH readings run from Day 1 of testing to Day 23. Figures in parenthesis are gauge in mils. Oxygen transmission was measured in cubic centimeters, standard temperature and pressure (24 hours, square meter, atmosphere) according to ASTM D 3985.

TABLE I

|  | EXAMPLE 1 | | | EXAMPLE 2 | | |
| --- | --- | --- | --- | --- | --- | --- |
|  | SAMPLE 1 | SAMPLE 2 | SAMPLE 3 | SAMPLE 1 | SAMPLE 2 | SAMPLE 3 |
| Oxygen Transmission at 73° F., 0% RH | 1.1(1.32) | 1.2(2.10) | 1.4(1.88) | 0.7(2.54) | 0.8(2.07) | 1.4(1.21) |
| Oxygen Transmission at 73° F., 100% RH | | | | | | |
| Day 3 | 1.5(1.32) | 0.4(2.10) | 1.7(1.88) | 1.5(2.54) | 1.5(2.07) | *2.8(1.21) |
| 4 | 3.9 | 2.0 | 1.5 | 1.5 | 3.7 | 5.8 |
| 5 | 4.3 | 2.2 | 1.5 | 1.5 | 3.5 | 5.8 |
| 8 | 4.0 | 1.7 | 1.9 | 1.9 | 1.9 | 5.6 |
| 9 | 3.9 | 1.7 | 1.9 | 1.9 | 1.7 | 5.4 |
| 10 | 4.0 | 1.5 | 2.0 | 2.0 | 1.5 | 5.2 |
| 15 | 3.9 | 1.3 | 2.0 | 2.0 | 0.9 | 5.2 |
| 16 | 4.1 | 1.5 | 2.1 | 2.1 | 0.8 | 5.2 |
| 17 | 3.9 | 1.3 | 2.1 | 2.1 | 0.6 | 5.2 |
| 18 | 3.7 | 1.1 | 1.9 | 1.9 | 0.6 | 5.1 |
| 19 | 3.7 | 1.1 | 1.7 | 1.7 | 0.4 | 4.8 |
| 23 | 2.0 | 0.2 | 0.2 | 0.2 | 0.2 | 3.4 |

Another advantage of the use of EVOH as an outside layer of a multilayer film, oriented out of hot water, is the improvement in free shrink. It is believed that this improvement results from the softening and moisturizing action of the hot water on the EVOH as the tubular film is passed through the hot water bath. In Table 2, free shrink data for a film passed through hot water is compared with the same film passed through hot oil.

TABLE 2

|  | EXAMPLE 1 (HOT WATER) | EXAMPLE 2 (HOT WATER) | EXAMPLE 1 (HOT OIL) | EXAMPLE 2 (HOT OIL) |
| --- | --- | --- | --- | --- |
| Free Shrink % at 185° F. | | | | |
| Av. Long. | 19. | 15. | 16. | 12. |
| Std. Dev. | 1. | 2. | 1. | 1. |
| 95% C.L. | 2. | 3. | 2. | 1. |
| Av. Trans. | 22. | 18. | 16. | 12. |
| Std. Dev. | 3. | 2. | 2. | 3. |
| 95% C.L. | 4. | 3. | 3. | 5. |
| Free Shrink (%) at 205° F. | | | | |
| Av. Long | 30. | 27. | 25. | 22. |
| Std. Dev. | 3. | 3. | 2. | 1. |
| 95% C.L. | 5. | 5. | 3. | 2. |
| Av. Trans. | 30. | 28. | 27. | 26. |
| Std. Dev. | 3. | 2. | 2. | 1. |
| 95% C.L. | 5. | 4. | 3. | 2. |

Example 1 and 2 of Table 2 refer to the same materials as in Examples 1 and 2 of Table 1.

Free shrink was measured according to ASTM D 2732-70 (reapproved 1976).

All values in Table 2 are averages obtained from four (4) replicate measurements.

C.L. is confidence limit, e.g. if the reported average was 10, and the 95% C.L. was 2, then of 100 replicate readings, 95 would have a value between 8 and 12 inclusive.

Av. Long. represents average longitudinal direction free shrink. Av. Trans. represents average transverse direction free shrink.

Std. Dev. represents standard deviation.

It should be understood that the detailed description and specific examples which indicate the presently preferred embodiments of the invention are given by way of illustration only since various changes within the spirit and scope of the invention will become apparent to those of ordinary skill in the art upon review of the above detailed description. As an example, the outside wetted EVOH layer may be combined with one or more layers of various polymeric materials by coextrusion techniques in order to provide coextruded films useful in different packaging applications.

Additionally, although it is preferred for many applications to make use of an oriented film with substantial shrink characteristics, benefits can be obtained by wetting a coextruded tape in a hot water bath, the tape having an outside layer of EVOH, without the need for subsequent orientation.

What is claimed is:

1. A method of producing an oxygen barrier film comprising:
    (a) coextruding a multi-layer film comprising an outside ethylene vinyl alcohol copolymer layer, and at least one layer bonded to the outside layer and comprising a polymeric material selected from the group consisting of a polyolefin or chemically modified polyolefin and a vinylidene chloride copolymer;
    (b) quenching the coextruded film in a col water bath;
    (c) softening and wetting the ethylene vinyl alcohol copolymer layer by passing the coextruded film through water at a temperature of between about 180° F. and 212° F.; and
    (d) orienting the heated film.

2. The method according to claim 1 wherein the ethylene vinyl alcohol copolymer is blended with a small percentage of a polyamide material prior to coextrusion.

3. The method according to claim 1 wherein the heated film is biaxially oriented.

4. The method according to claim 3 wherein the heated film is biaxially oriented by a blown bubble technique.

* * * * *